United States Patent [19]

Park

[11] Patent Number: 5,469,449
[45] Date of Patent: Nov. 21, 1995

[54] FIFO BUFFER SYSTEM HAVING AN ERROR DETECTION AND RESETTING UNIT

[75] Inventor: Yong-Gyu Park, Seoul, Rep. of Korea

[73] Assignee: Daewoo Electronics Co., Ltd., Seoul, Rep. of Korea

[21] Appl. No.: 320,631

[22] Filed: Oct. 11, 1994

[30] Foreign Application Priority Data

Oct. 28, 1993 [KR] Rep. of Korea ...................... 93-22616

[51] Int. Cl.⁶ .................................................. H03M 13/00
[52] U.S. Cl. ........................... 371/40.1; 371/21.1; 365/78; 365/189.04
[58] Field of Search .............................. 364/900 MS File; 395/800; 365/189.04, 221, 73, 78, 189.07; 371/40.1, 21.1–21.5

[56] References Cited

U.S. PATENT DOCUMENTS

| | | | |
|---|---|---|---|
| 4,193,123 | 3/1980 | Meinke ..................................... | 364/900 |
| 4,873,667 | 10/1989 | Gendah et al. ..................... | 365/189.07 |
| 5,262,996 | 11/1993 | Shive ........................................ | 365/221 |
| 5,305,253 | 4/1994 | Ward .......................................... | 365/73 |
| 5,311,475 | 5/1994 | Huang ..................................... | 365/221 |
| 5,345,419 | 9/1994 | Fenstermaker et al. ........... | 365/189.04 |
| 5,349,683 | 9/1994 | Wu et al. ................................. | 395/800 |

*Primary Examiner*—James P. Trammell
*Attorney, Agent, or Firm*—Anderson, Kill, Olick & Oshinsky

[57] ABSTRACT

A FIFO buffer system has an error detection and resetting unit for resetting the FIFO buffer system at the occurrence of errors therein. The system comprises M number of data storage circuits arranged in parallel for temporarily storing the N-bit input digital data and producing the N-bit output digital data in synchronization, each of said data storage circuits synchronously storing (N/M)-bit input digital data and generating storage state signals including a full flag and an empty flag signals representative of the full and the empty states thereof, respectively; and error detection and resetting unit, responsive to the storage state signals generated by said M number of data storage circuits, for generating a reset signal for resetting the FIFO buffer system when there exists a discrepancy among the full flag signal or the empty flag signals.

4 Claims, 2 Drawing Sheets

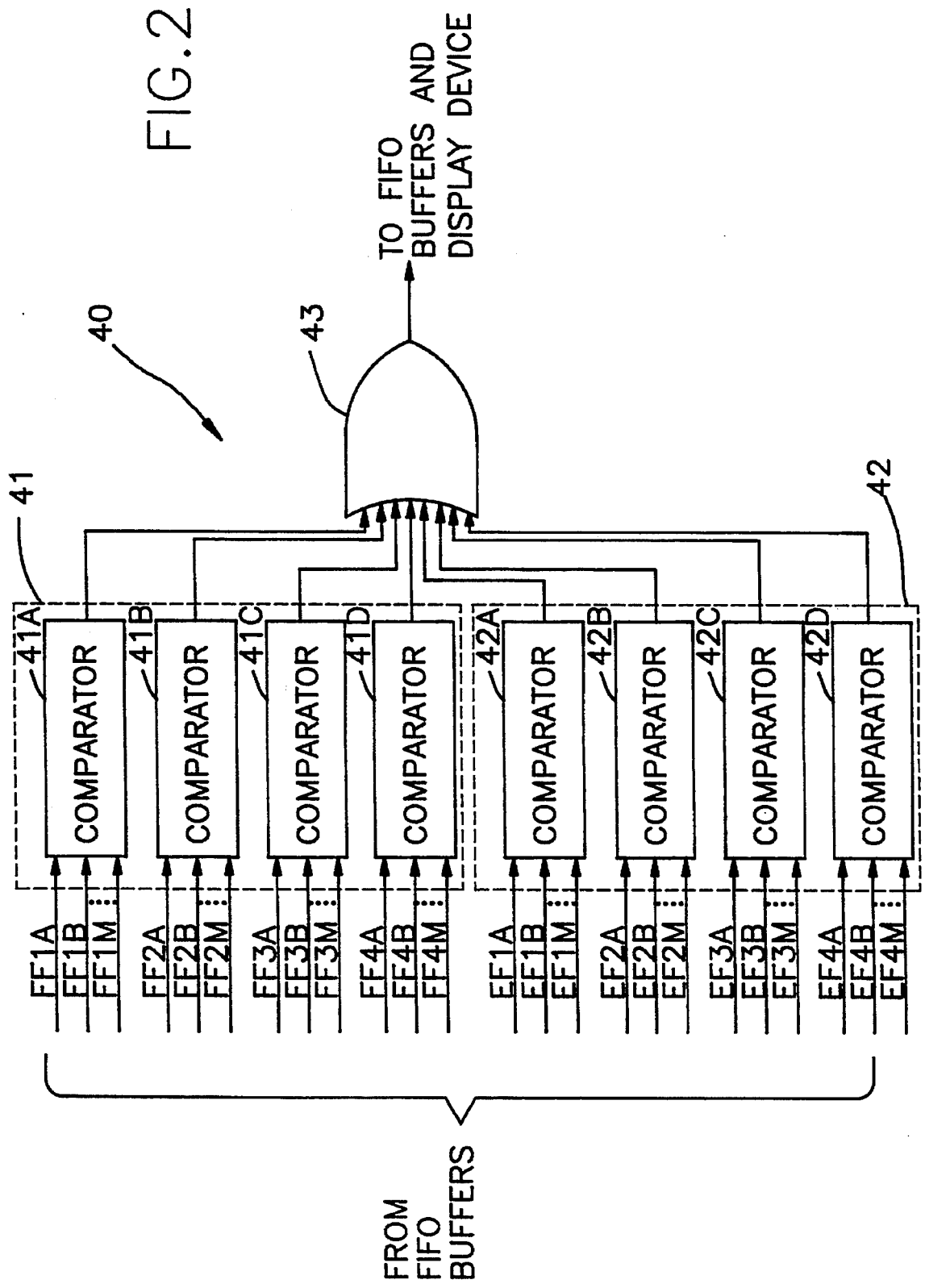

FIFO BUFFER SYSTEM HAVING AN ERROR DETECTION AND RESETTING UNIT

FIELD OF THE INVENTION

The present invention relates to a First-In-First-Out (FIFO) buffer system; and, more particularly, to an improved FIFO buffer system capable of detecting and resetting errors therein.

DESCRIPTION OF THE PRIOR ART

As is well known, a FIFO buffer system is widely utilized in various electronic/electrical applications. The conventional FIFO buffer system is provided with at least one FIFO buffer memory and is adapted for temporarily storing input digital data transmitted, e.g., in the form of discontinuous bit streams having varying or higher bit rates, which may be converted to a continuous bit stream having a lower constant bit rate.

The FIFO buffer memory is generally implemented by using a semiconductor integrated circuit and serves to store only the input digital data having a fixed bit width due to the limited hardware capacity. Therefore, the FIFO buffer system generally employs a plurality of FIFO buffer memories, each of which has an input bus having the fixed bit width, in order to process input digital data having a greater bit width than that of a FIFO buffer memory. In such a case, the FIFO buffer memories are arranged in a parallel fashion in order to enable the FIFO buffer memories to simultaneously process divided input digital data.

As is well known, in such an arrangement, it is required that the divided input digital data be simultaneously or synchronously stored(or written) into the parallel FIFO buffer memories, and outputted(or read) therefrom in the same manner so as to produce output digital data which is identical to the input digital data.

Sometimes, however, there occurs an asynchronism during a read or write operation for the FIFO buffer memories due to such noises as glitches or spikes present in a read or write control signal, thereby entailing erroneous output digital data.

SUMMARY OF THE INVENTION

It is, therefore, a primary object of the invention to provide an improved FIFO buffer system having an error detection and resetting unit for resetting the FIFO buffer system upon the occurence of errors therein.

In accordance with the invention, there is provided a FIFO buffer system, capable of storing N-bit input digital data, for producing N-bit output digital data having a constant bit rate, N being a multiple of M and M being an positive integer, which comprises: M number of data storage means arranged in parallel for temporarily storing the N-bit input digital data and producing the N-bit output digital data in synchronization, each of said data storage means synchronously storing (N/M)-bit input digital data and generating storage state signals including a full flag and an empty flag signals representative of the full and the empty states thereof, respectively; and error detection and resetting means, responsive to the storage state signals generated by said M number of data storage means, for generating a reset signal for resetting the FIFO buffer system when there exists a discrepancy among the full flag signals or the empty flag signals.

Said error detection and resetting means includes first error detection means responsive to the full flag signals for generating a full error signal when there is a discrepancy among the full flag signals; second error detection means responsive to the empty flag signals for generating an empty error signal when there is a discrepancy among the empty flag signals; and error resetting means responsive to the full error signal or the empty error signal for generating the reset signal for resetting the FIFO buffer system.

BRIEF DESCRIPTION OF THE DRAWINGS

The above and other objects and features of the present invention will become apparent from the following description of preferred embodiments taken in conjunction with the accompanying drawings, in which:

FIG. 2 illustrates a detailed block diagram of the error detection and resetting unit shown in FIG. 1.

DETAILED DESCRIPTION OF THE PREFERRED EMBODIMENTS

Figure 1:
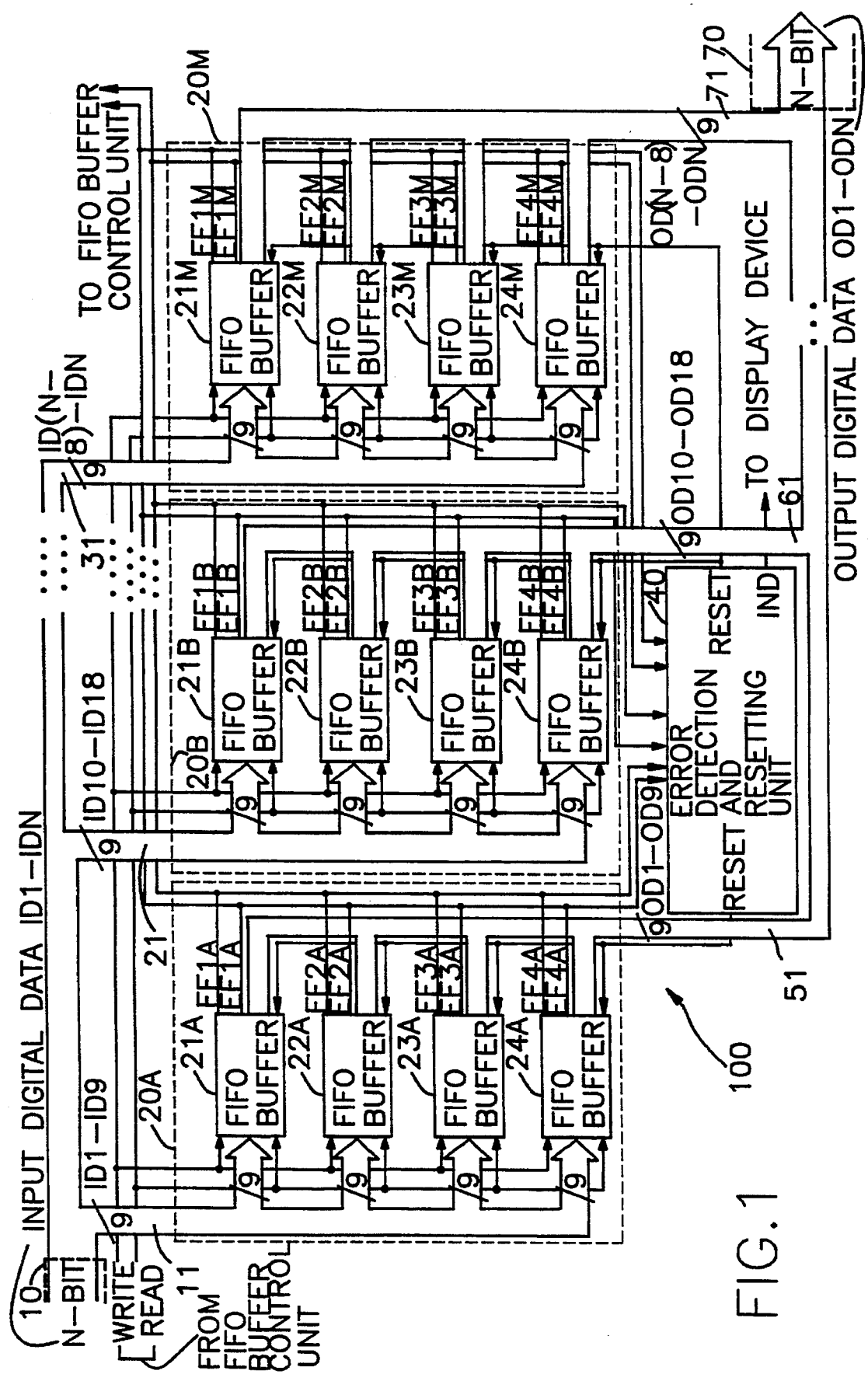
FIG. 1 shows a schematic diagram of a novel FIFO buffer system having an error detection and resetting unit in accordance with the present invention.

Referring to FIG. 1, there is shown an inventive FIFO buffer system 100 having an error detection and resetting unit 40 in accordance with the present invention.

The FIFO buffer system 100 comprises first and second external buses 10 and 70, M data storage modules 20A to 20M, and the error detection and resetting unit 40.

In the FIFO buffer system 100, the first external bus 10, which is adapted to transfer N-bit input digital data, i.e., ID1 to IDN, in parallel, is coupled with internal input buses 11 to 31. Also, the second external bus 70, which is equipped to transfer N-bit output digital data, i.e., OD1 to ODN, in a parallel fashion, is connected with internal output buses 51 to 71.

In accordance with a preferred embodiment of the present invention, each of the M data storage modules 20A to 20M includes four conventional FIFO buffers, which are coupled in a cascade manner. That is, each of the data storage modules includes four cascaded FIFO buffers which sequentially perform write or read operation.

It should be noted that the number of FIFO buffers included in each of the data storage modules is determined based on the storage capacity of each of the FIFO buffers and the bit rate differences between the input and the output digital data.

As shown in FIG. 1, each of the internal input buses 11 to 31, which is coupled to an input stage of each of the FIFO buffers 21A to 24M, transfers N/M, e.g., 9, bit divided input digital data, i.e., (ID1–ID9) to (ID(N–8)–IDN), in a parallel form, wherein N, M and N/M are positive integers. The function of the internal output buses 51 to 71 is substantially identical to that of the internal input buses 11 to 31 excepting that each of the internal output buses is connected to an output stage of each of the FIFO buffers.

Each of the divided 9-bit input digital data, i.e., (ID1–ID9) to (ID(N–8)–IDN), on the internal input buses 11 to 31 is applied to the M data storage modules 20A to 20M, each of which simultaneously performs the write operation of the 9-bit input data. In a similar manner, each of the 9-bit output digital data, i.e., (OD1–OD9) to (OD(N–8)–ODN), is simultaneously read from each of the data storage modules.

Each of the FIFO buffers provides a FIFO buffer control unit(not shown) and the error detection and resetting unit 40 with such a buffer state signal as a full flag(FF) or empty flag(EF) signal, e.g., FF1A or EF1A, indicating whether the buffer is full or empty, respectively; and the FIFO buffer control unit determines WRITE or READ signal in response to the buffer state signal.

Specifically, each of the divided 9-bit input digital signals, e.g., (ID1–ID9) to (ID(N–8)–IDN), on the internal input buses 11 to 31 is simultaneously written onto first cascaded FIFO buffers 21A to 21M, respectively, in response to the WRITE control signal issued by the FIFO buffer control unit. Once the first cascaded FIFO buffers are filled, the writing operation is shifted to the second cascaded FIFO buffers 22A to 22M. This process is sequentially repeated for next cascaded FIFO buffers.

Read operation is also performed in a similar manner as the write operation. That is, the divided 9-bit input digital data stored in FIFO buffers are read as a 9-bit output data simultaneously from the first cascaded FIFO buffers and sequentially through the next cascaded FIFO buffers. Each of the 9-bit output data on each of the internal output buses 51 to 71 is then combined at the second external bus 70 to thereby generate N-bit output data in the form of, e.g., a continuous bit stream having a constant bit rate.

It should be noted that the write operation is carried out on completely emptied FIFO buffers, whereas the read operation is performed on completely filled FIFO buffers. Therefore, if the write or read operation is not carried out synchronously on the ith cascaded FIFO buffers(i=1, 2, 3, 4), the empty flag or full flag signals from the ith cascaded FIFO buffers will not be identical, which would mean an erroneous operation of the FIFO buffer system 100.

In the meanwhile, the error detection and resetting unit 40 which is responsive to the buffer state signals, e.g., FF1A and EF1A, provided from each of the FIFO buffers generates a reset signal for resetting the FIFO buffer system 100 when a discrepancy among the buffer state signals occurs.

Referring now to FIG. 2, the error detection and resetting unit 40 comprises first and second error detection circuits 41 and 42, and an error resetting circuit 43, wherein each of the error detection circuits 41 and 42 includes a plurality of comparators, e.g., 41A to 41D and 42A to 42D, in accordance with the invention.

Inputs to each of the comparators in the error detection circuits 41 and 42 are full flag and empty flag signals, respectively, generated from the ith cascaded FIFO buffers included within the data storage modules. For instance, inputs to the comparator 41A are full flag signals FF1A to FF1M, which are provided by the first cascaded FIFO buffers 21A to 21M of the data storage modules 20A to 20M, respectively; and inputs to the comparator 42C are empty flag signals EF3A to EF3M fed from the third cascaded FIFO buffers 23A to 23M, and so on.

Each of the comparators generates logic 1 if the inputs thereto are not identical. That is, the output from each of the comparators will be logic 0 only if the inputs are all logic 1's or logic 0's; and logic 1 if one of the inputs has a logic value different from others. The error resetting circuit 43, which can be easily implemented by employing a conventional OR gate well known in the art, takes outputs from the comparators and generates logic 1 as the reset signal if more than one output from the comparators are logic 1, and, otherwise, it generates logic 0.

In other words, the error detection and resetting circuit 40 in accordance with the present invention provides the reset signal indicating an erroneous operation of the FIFO buffer system 100 if the ith cascaded FIFO buffers are not in an identical buffer state. It should be noted that once the error occurs in any of the FIFO buffers of the FIFO buffer system, the subsequent output digital data becomes all erroneous.

In accordance with the present invention, the reset signal from the error detection and resetting unit 40 is fed to all the FIFO buffers of the FIFO buffer system 100, thereby initializing the FIFO buffer system by resetting the FIFO buffers or removing the stored data in the FIFO buffers.

Also, when the erroneous operation of the FIFO buffer system 100 is detected, the error detection and resetting unit 40 of the present invention transmits an error signal(IND) to a display device(not shown), e.g., a monitor or a liquid crystal display, for its visual display for the user.

While the present invention has been shown and described with reference to the particular embodiments, it will be apparent to those skilled in the art that many changes and modifications may be made without departing from the spirit and scope of the invention as defined in the appended claims.

What is claimed is:

1. A FIFO buffer system, capable of storing N-bit input digital data, for producing N-bit output digital data having a constant bit rate, N being a multiple of M and M being an positive integer, which comprises:

M number of data storage means arranged in parallel for temporarily storing the N-bit input digital data and producing the N-bit output digital data in synchronization, each of said data storage means synchronously storing (N/M)-bit input digital data and generating storage state signals including a full flag and an empty flag signals representative of the full and the empty states thereof, respectively; and error detection and resetting means, responsive to the storage state signals generated by said M number of data storage means, for generating a reset signal for resetting the FIFO buffer system when there exists a discrepancy among the full flag signals or the empty flag signals.

2. The system as recited in claim 1, wherein said error detection and resetting means includes:

first error detection means responsive to the full flag signals for generating a full error signal when there exists a discrepancy among the full flag signals;

second error detection means responsive to the empty flag signals for generating an empty error signal when there exists a discrepancy among the empty flag signals; and error resetting means responsive to the full error signal or the empty error signal for generating the reset signal for resetting the FIFO buffer system.

3. The system as recited in claim 2, wherein each of the M data storage means includes two or more cascaded FIFO buffer memories for sequentially storing the (N/M)-bit input digital data.

4. The system as recited in claim 3, further comprising display means for visually displaying the full error signal or the empty error signal.

* * * * *